Figure 1:
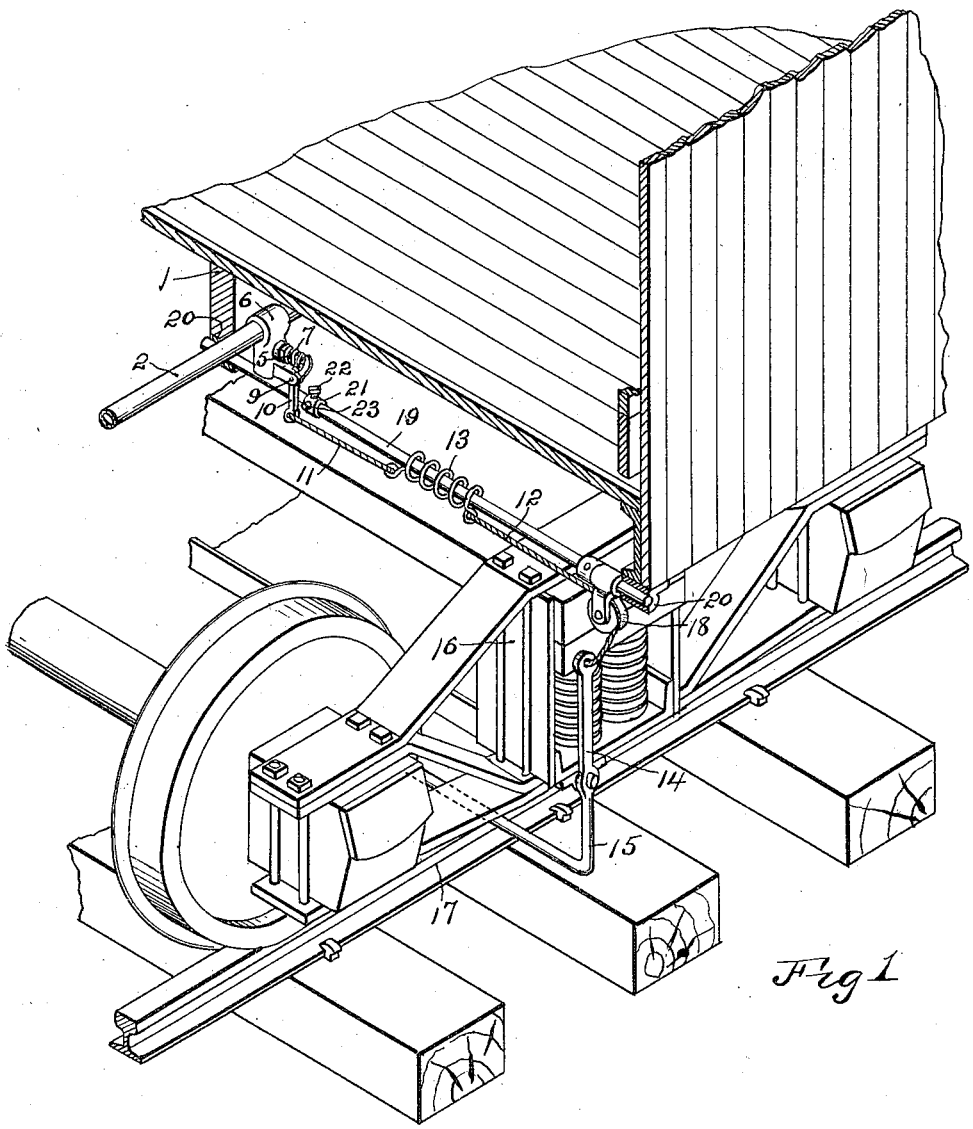

W. M. CRANDALL.
SAFETY APPLIANCE FOR AIR BRAKE MECHANISMS.
APPLICATION FILED JUNE 20, 1912.

1,078,663.

Patented Nov. 18, 1913.

2 SHEETS—SHEET 1.

WITNESSES:
R. E. Hamilton
C. B. House.

INVENTOR.
William M. Crandall
BY
Warren D. House
His ATTORNEY.

W. M. CRANDALL.
SAFETY APPLIANCE FOR AIR BRAKE MECHANISMS.
APPLICATION FILED JUNE 20, 1912.
1,078,663.
Patented Nov. 18, 1913.
2 SHEETS—SHEET 2.
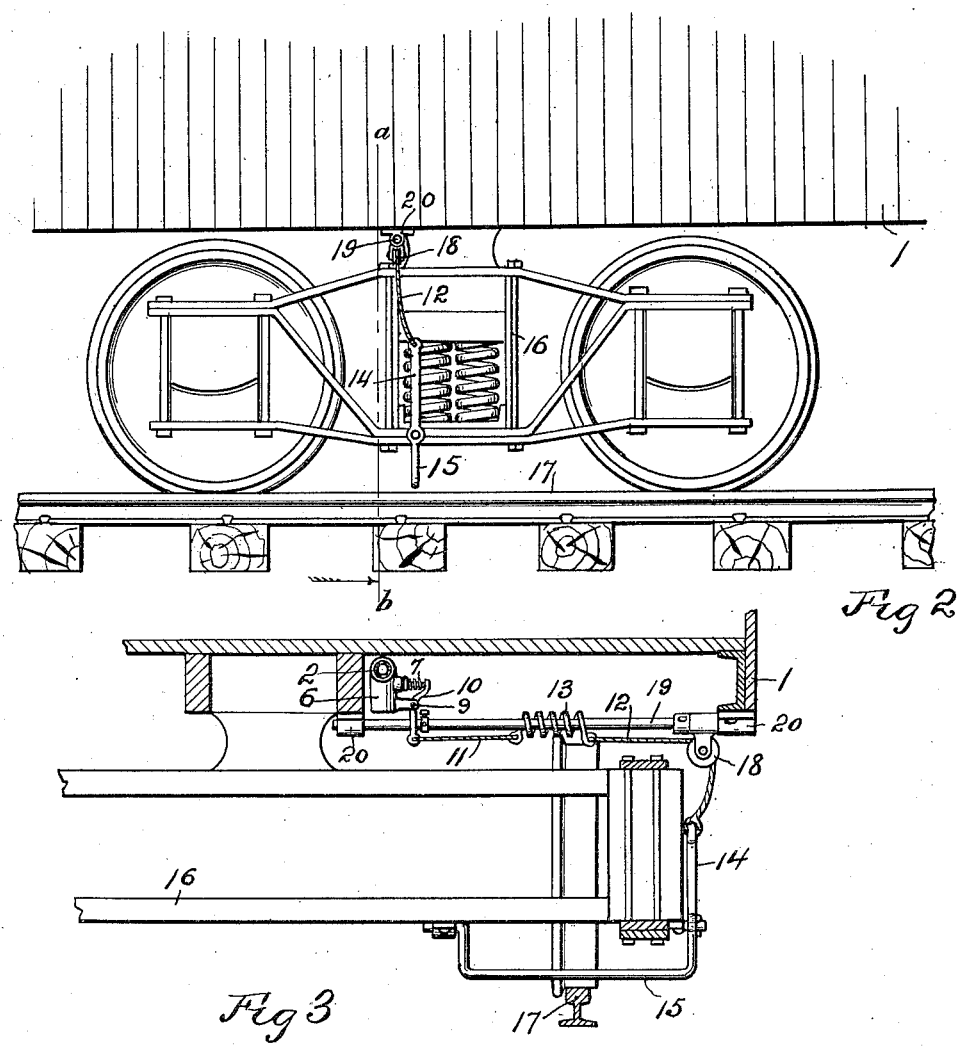
WITNESSES:
R. E. Hamilton
E. B. House
INVENTOR.
William M. Crandall
BY Warren D. House
His ATTORNEY.

UNITED STATES PATENT OFFICE.

WILLIAM M. CRANDALL, OF STILWELL, KANSAS.

SAFETY APPLIANCE FOR AIR-BRAKE MECHANISMS.

1,078,663.   Specification of Letters Patent.   Patented Nov. 18, 1913.

Application filed June 20, 1912. Serial No. 704,753.

*To all whom it may concern:*

Be it known that I, WILLIAM M. CRANDALL, a citizen of the United States, and a resident of Stilwell, in the county of Johnson and State of Kansas, have invented certain new and useful Improvements in Safety Appliances for Air-Brake Mechanisms, of which the following is a specification.

My invention relates to improvements in safety appliances for air brake mechanisms.

The object of my invention is to provide novel means for actuating the air brake mechanism to stop a train when the truck of a car leaves the track. Oftentimes a truck of a car will leave the track and run along on the ties for a considerable distance before causing a wreck. With my improvement, as soon as a truck leaves the track, the air brake mechanism is actuated to stop the train, thereby preventing serious damage.

A further object of my invention is to provide a mechanism by which the air brake mechanism will be actuated when a truck leaves the track irrespective of the direction in which the car is running at the time.

A further object of my invention is to provide a construction which will permit the swaying and vertical movement of the body of the car relative to the truck, without effecting an actuation of the braking mechanism unless the truck leaves the track.

Other novel features of my invention are hereinafter fully described and claimed.

The accompanying drawings illustrate the preferred form of my invention.

Figure 1 is a perspective view of a portion of a common box car provided with my improvement. Fig. 2 is a side elevation of the same. Fig. 3 is a vertical section on the line *a—b* of Fig. 2. Fig. 4 is an enlarged detail view of the controlling valve mechanism and parts connected therewith.

Similar reference characters designate similar parts in the different views.

1 designates the body of a car which supports the usual train pipe mechanism including a train pipe 2 having a passage 3 adapted to communicate with the atmosphere, said passage being normally closed by a controlling valve 4 having a stem 5 extending through a valve casing 6 in which the passage 3 is located. Encircling the stem 5 is a coil spring 7 one end of which bears against the casing 6, the other end bearing against a transverse pin 8 in the stem 5. The spring 7 normally holds the valve 4 closed.

Pivoted to the casing 6 by a horizontal pin 9 is a lever 10 the upper end of which is adapted to strike the stem 5 for moving the valve to the open position. The other end of the lever 10 has secured to it one end of a flexible device comprising two cords 11 and 12 having one set of ends secured respectively to opposite ends of a coil spring 13, the other set of ends being secured respectively to the lever 10 and to a vertically extending arm 14 of a U shaped lever 15 which is pivoted to some suitable portion of the truck 16 which supports the body 1 and is adapted to run on a track one of the rails 17 of which is shown in the drawings.

The cord 12 passes over a pulley 18 which is pivoted on a horizontal transverse bar 19 secured to the body 1 and serves as a swinging support for the cord 12. Preferably the coil spring 13 is mounted on the bar 19, which may be secured to the body 1 by bearings 20.

If the vacuum brake system is employed having the pressure in the train pipe 2 below atmospheric, the spring 7 will return the valve 4 to the closed position after being opened and help to retain it in the closed position.

If the pressure in the train pipe 2 is greater than atmospheric, as is the case in pressure systems, the spring 7 must have sufficient strength to overcome the air pressure in passage 3. The spring 13 should have sufficient strength to effect the opening of the valve 4 against the air pressure and the pressure of the spring 7. Secured adjustably on the bar 19 is a collar 21 having a set screw 22 adapted to bear against the bar 19 and having a lateral projection 23 adapted to be struck by the lever 10 to limit the opening movement thereof.

Normally the lever 15 rests in the depending position shown in the drawings and in this position is inoperative. When in this position, with the truck on the track the horizontal portion of the lever 15 extends over but out of contact with the rail 17. If the truck leaves the track, the horizontal portion of the lever 15 will strike the rail 17 thereby laterally swinging the lever 15, and, through the intervention of the arm 14 drawing the flexible device including the spring 13 and cords 11 and 12 so as to swing the lever 10 to the open position and against the projection 23, thereby opening the valve 4, at which time the brakes will be set in the usual manner, thereby avoiding a wreck. If the lever 15 swings a distance greater than is required to draw the lever 10 against the projection 23, the spring 13 will yield so as not to break any of the parts.

I do not limit my invention to the structure described and claimed, as modifications, within the scope of the appended claims, may be made without departing from the spirit of my invention.

Having thus described my invention, what I claim and desire to secure by Letters Patent, is:—

1. In a safety appliance for air brake mechanisms, the combination with a car having a truck and a body carried by the truck, of a train pipe mechanism carried by the body and including a controlling valve, a lever pivoted to the truck and normally held in an inoperative position when the truck is on the track and movable to an operative position when the truck leaves the track, a swinging support carried by the body and swinging about an axis at right angles to the length of the body, a second lever for actuating the controlling valve, and a flexible device connecting the two levers and mounted on said swinging support for operating the second lever when the first lever is moved to the operative position.

2. In a safety appliance for air brake mechanisms, the combination with a car, of a train pipe mechanism carried by the car and including a controlling valve, a transverse bar carried by the car, a lever for actuating the said valve, a second lever pivoted to the car so as to be adapted to swing forwardly and backwardly, a pulley mechanism pivoted to said bar, and a flexible device passing over said pulley mechanism and supported thereby and connected to said levers for operating the first lever when the second lever is swung, said flexible device including a coil spring supported by said bar.

3. In a safety appliance for air brake mechanisms, the combination with a car, of a train pipe mechanism including a controlling valve, a transverse bar carried by the car, a lever for actuating said valve, a second lever normally inactive, but adapted to be swung forwardly or backwardly when the car leaves the track, said second lever being pivoted to the car on an axis parallel with said bar, a pulley mechanism pivotally but not longitudinally movable on said bar, and a flexible connecting mechanism attached to said two levers and supported by said pulley mechanism.

In testimony whereof I have signed my name to this specification in the presence of two subscribing witnesses.

WILLIAM M. CRANDALL.

Witnesses:
WARREN D. HOUSE,
E. B. HOUSE.

---

Copies of this patent may be obtained for five cents each, by addressing the "Commissioner of Patents, Washington, D. C."